US005382560A

United States Patent [19]

Hisada et al.

[11] Patent Number: 5,382,560

[45] Date of Patent: Jan. 17, 1995

[54] COLOR DEVELOPERS AND SHEETS THEREOF

[75] Inventors: Nobuo Hisada, Moriyama; Yasushi Nishigakiuchi, Uji; Yoshiyuki Ueno, Kyoto; Yasuo Kotani, Habikino; Tadao Yagyu, Kyoto, all of Japan

[73] Assignee: Sanyo Chemical Industries, Ltd., Kyoto, Japan

[21] Appl. No.: 989,565

[22] Filed: Dec. 11, 1992

[30] Foreign Application Priority Data

| | | | |
|---|---|---|---|
| Dec. 18, 1991 | [JP] | Japan | 3-354841 |
| Jul. 1, 1992 | [JP] | Japan | 4-199139 |
| Aug. 27, 1992 | [JP] | Japan | 4-253754 |

[51] Int. Cl.$^6$ ....................... B41M 5/135; B41M 5/30; C07F 3/06; C09D 11/00

[52] U.S. Cl. ................................. 503/209; 106/21 R; 503/212; 503/216; 503/225; 556/27; 556/106; 556/115; 556/132; 556/147; 560/57; 562/468

[58] Field of Search ............................... 427/150-152; 503/210-212, 216, 225, 209; 106/21 R; 556/27, 106, 115, 147; 560/57; 562/468

[56] References Cited

U.S. PATENT DOCUMENTS

| | | | |
|---|---|---|---|
| 4,748,259 | 5/1988 | Nachbur | 356/132 |
| 5,274,150 | 12/1993 | Tanabe et al. | 556/132 |

FOREIGN PATENT DOCUMENTS

| | | |
|---|---|---|
| 0264751 | 4/1988 | European Pat. Off. . |
| 0303443 | 2/1989 | European Pat. Off. . |
| 0283924 | 5/1989 | European Pat. Off. . |
| 2-91043 | 3/1990 | Japan . |
| 2025940 | 8/1984 | United Kingdom . |

OTHER PUBLICATIONS

Patent Abstracts of Japan, vol. 14, No. 311 (M-994) 4 Jul. 1990 and JP-A-02103176 (Mitsubishi Paper Mills Limited) *Abstract*.

*Primary Examiner*—B. Hamilton Hess
*Attorney, Agent, or Firm*—Oblon, Spivak, McClelland, Maier & Neustadt

[57] ABSTRACT

A color developer is provided comprising a polyvalent metal salt of a salicylic derivative. The salicylic derivative is made up of ring-substituted salicylic compounds having one, two and three styrene units bonded to salicylic core where at least 25% of the salicylic derivatives are polyvalent metal salts.

23 Claims, No Drawings

COLOR DEVELOPERS AND SHEETS THEREOF

FIELD OF THE INVENTION

The present invention relates to a color developer. Particularly, the present invention relates to a color developer for pressure-sensitive recording paper comprising a polyvalent metal salt of a ring-substituted salicylic compound, and a sheet of a color developer formed thereon.

BACKGROUND DISCUSSION

Polyvalent metal salts of alkyl-substituted salicylic acids, in particular zinc salts, have been used as color developers in pressure-sensitive recording paper.

In Japanese Patent Publication No. 25174/1976, polyvalent metal salts of salicylic derivatives which are disubstituted in positions 3 and 5 by an α-methylbenzyl, α,α-dimethylbenzyl or cyclohexyl radical are mentioned as organic color-developers for pressure-sensitive recording paper. In the U.S. Pat. No. 4,748,259, a mixture of the zinc salt of 5-[α-methyl-4'-(α-methylbenzyl)benzyl]salicylic acid and zinc salt of 3,5-bis(α-methylbenzyl)salicylic acid, and in a 50/50 weight ratio, both of which have two styrene units, is disclosed as a color developer. In Japanese Patent Application Laid-open No. 91043/1990, a mixture of 3,5-bis(α-methylbenzyl)salicylic acid, 3-α-methylbenzyl-5-(1,3-diphenylbutyl) salicylic acid, 5-α-methylbenzyl-3-(1,3-diphenylbutyl) salicylic acid which have two or three styrene units in a weight ratio of 72:28 or 85:15 is still disclosed.

However, developers containing the above salts are insufficient as to both their speed of color development and their color concentration; in other words they provide inadequate image density particularly when multiple copies are required in rapid succession.

They also discolor easily, and are particularly susceptible to yellowing when exposed to NOx gas.

OBJECTS OF THE INVENTION

Accordingly, it is an object of the present invention to provide a color developer resistant to discoloration upon exposure to NOx gas. It is another object of the present invention to provide an improved color developer providing both increased speed of color development and increased color concentration. It is also an object of the present invention to provide a developer with little or no colored metal salts of salicylic derivatives.

Another object of the present invention is to provide a color developer sheet with the above developer thereon.

These objects have been achieved by providing a color developer comprising a particular composition comprising three components in a specified ratio and, optionally, polyoxyalkylene polyol or fatty acid ester thereof as a novel sensitizer.

DETAILED DESCRIPTION OF THE INVENTION

The present invention relates to a color developer comprising a polyvalent metal salt of a salicylic derivative comprising 5 to 60% by weight, preferably 10 to 45% by weight of at least one ring-substituted salicylic compound having one styrene unit, 15 to 70% by weight, preferably 30 to 60% by weight of at least one ring-substituted salicylic compound having two styrene units and 10 to 40% by weight, preferably 12 to 30% by weight of at least one ring-substituted salicylic compound having three styrene units and a color developer sheet with a layer containing the above-mentioned three-component color developer, said layer being formed on a surface of a supporting sheet. In the present invention a styrene unit is defined as a radical or group originated from styrene or a substituted styrene compound substituted with, e.g., C1~C4 alkyl, phenyl and hydroxy groups, halogen atoms, etc. At least some of the ring-substituted salicylic compounds in the above color developer with one, two or three styrene units are polyvalent metal salts.

Suitable ring-substituted salicylic compounds having one styrene unit include 3-(α-methylbenzyl) salicylic acid, 5-(α-methylbenzyl) salicylic acid, 3-(α,α-dimethylbenzyl) salicylic acid, 5-(α,α-dimethylbenzyl) salicylic acid, 3-(4'-methyl-α-methylbenzyl) salicylic acid, 5-(4'-methyl-α-methylbenzyl) salicylic acid, 3-(3'-methyl-α-methylbenzyl) salicylic acid, 5-(3'-methyl-α-methylbenzyl) salicylic acid, 3-(4'-hydroxy-α-methylbenzyl) salicylic acid, 5-(4'-hydroxy-α-methylbenzyl) salicylic acid, 3-(4'-chloro-α-methylbenzyl) salicylic acid and 5-(4'-bromo-α-methylbenzyl) salicylic acid.

Suitable ring-substituted salicylic compounds having two styrene units include 3,5-bis(α-methylbenzyl) salicylic acid, 3,5-bis(α,α-dimethylbenzyl) salicylic acid, 3,5-bis(4'-methyl-α-methylbenzyl) salicylic acid, 3,5-bis(3'-methyl-α-methylbenzyl) salicylic acid, 3-(α-methylbenzyl)-5-(α,α-dimethylbenzyl) salicylic acid, 5-[4'-α'-methylbenzyl) α-methylbenzyl] salicylic acid, 3-]4'-α'-methylbenzyl-α-methylbenzyl] salicylic acid, 3-1',3'-diphenylbutyl salicylic acid, and 5-1',3'-diphenylbutyl salicylic acid.

Suitable ring-substituted salicylic compounds having three styrene units include 3-(α-methylbenzyl)-5-[(4'-α'-methylbenzyl)-α-methylbenzyl] salicylic acid, 3-[4'-(α'-methylbenzyl)-α-methyl benzyl]-5-α-methylbenzyl salicylic acid, 3-[4'-methyl-α-methyl benzyl)benzyl-5-(4'-(α'-methylbenzyl)-α-methylbenzyl] salicylic acid, 3-(α,α-dimethylbenzyl)-5-[4'-α'-methylbenzyl)α-methylbenzyl] salicylic acid, 3-[4'-(α'-methylbenzyl)-α-methylbenzyl]-5-(α-methyl benzyl) salicylic acid, 3-(α-methylbenzyl)-5-(1',3'-diphenylbutyl) salicylic acid and 3-(1',3'-diphenylbutyl)-5-(α-methylbenzyl) salicylic acid.

Suitable polyvalent metals of the invention ring-substituted salicylate salt of the present invention are preferably derived from divalent, trivalent or tetravalent metals having an atomic weight from 24 to 210, preferably from 26 to 120. Such metals are exemplified by zinc, calcium, magnesium, barium, lead, zirconium, vanadium and tin. Among these, zinc is particularly preferred.

Suitable styrene compounds for preparing the above described ring-substituted salicylic acid compounds include styrene, α-methyl styrene, p-methyl styrene, o-methylstyrene, m-methylstyrene, p-chlorostyrene, 2,4-dimethylstyrene, p-vinylphenol, vinylnaphthalene and mixtures thereof. Among these, styrene is preferred.

These styrene compounds are used in a mole ratio of no less than 1, preferably 1.5 to 3.0 based on the salicyclic acid compound. When the ratio is below 1 or exceeds 3, the color concentration of the developed image lowers.

Suitable salicylic acid compounds for preparing the above-described ring-substituted salicylic compounds include alkyl-substituted salicylic acids such as salicylic acid, 3-ethyl salicylic acid, 5-ethyl salicylic acid, 3-tert-butyl salicylic acid, alicyclic radical-substituted salicylic acids such as 5-cyclohexyl salicylic acid and halogen-substituted salicylic acids such as 5-chloro salicylic acid and a mixture thereof. Among these, salicylic acid is preferred.

The salicylic derivatives of the present invention are obtained by fractionating a reaction product of a phenol compound and a styrene compound, followed by reacting each fraction of the ring-substituted phenol having one, two or three styrene units with carbon dioxide under the pressure, as disclosed in the Japanese Patent Publication No. 25174/1976.

Salicylic derivatives of the present invention are also obtained by reacting a salicylic acid compound with a styrene compound in the presence of a catalyst, followed by fractionating or separating chromatographically the reaction product.

Such catalysts in the latter process are aliphatic or aromatic hydrocarbon sulfonic acids, mineral acids, etc. Polyvalent metal salts of organic carboxylic acids are particularly preferred to prepare a particular composition comprising the ring-substituted salicylic compounds according to the present invention. No more than 10% by weight of known catalysts can be used together with the above salts.

Suitable carboxylic acids include aliphatic carboxylic acids such as formic acid, acetic acid, propionic acid, palmitic acid, stearic acid and oxalic acid, aromatic carboxylic acids such as benzoic acid, salicylic acid, 3-benzyl salicylic acid, 5-benzyl salicylic acid, 3-α-methylbenzyl salicylic acid, 5-α-methylbenzyl salicylic acid, 3-α,α-dimethylbenzyl salicylic acid, 5-α,α-dimethylbenzyl salicylic acid, 3-(4′-hydroxy-α-methylbenzyl) salicylic acid, 5-4′-hydroxy-α-methyl benzyl salicylic acid, 3-(4′-chloro-α-methylbenzyl) salicylic acid, 5-(4′-bromo-α-methylbenzyl) salicylic acid, 3,5-bis(α-methylbenzyl) salicylic acid, 3,5-bis(α,α-dimethylbenzyl) salicylic acid, 3-α-methylbenzyl-5-(α,α-dimethylbenzyl) salicylic acid, 3,5-dibenzyl salicylic acid, 3-benzyl-5-(α,α-dimethylbenzyl) salicylic acid, 3-benzyl-5-(α-methylbenzyl) salicylic acid, 5-[4′-(α′-methylbenzyl)-αmethylbenzyl] salicylic acid, 3-[4′-(α′-methylbenzyl)-α-methyl benzyl] salicylic acid, 3-α-methylbenzyl-5-[4′-(α′-methylbenzyl)-α-methylbenzyl] salicylic acid, 3-[4′-(α′-methylbenzyl)-α-methylbenzyl]-5-(α-methylbenzyl salicylic acid, 3-α,α-dimethylbenzyl-5-[4′-(α′-methylbenzyl)-α-methylbenzyl] salicylic acid, 3-[4′(α′-methyl benzyl)-α-methylbenzyl]-5-α-methylbenzyl salicylic acid, 3-α-methyl benzyl-5-(1′,3′-diphenyl butyl) salicylic acid, 3-(1′,3′-diphenylbutyl)-5-α-methylbenzyl salicylic acid, 3,5-di-tert-butylsalicylic acid, and 3,5-dicylclohexyl salicylic acid.

Among these, aromatic carboxylic acids are preferred with hydrocarbyl-substituted salicylic acids being more preferable because the above aromatic carboxylic acids can join with a member of a color developer component.

Metals of the organic carboxylate salt may be identical with those of the ring-substituted salicylate salt, a member of the color developer. Zinc is in particular preferred.

The metal salts of the organic carboxylic acids are used in amount of 1 to 100 parts by weight, preferably 5 to 60 parts by weight based on 100 parts by weight of the salicylic acid compounds.

A preferred process for the preparation of the ring-substituted salicylic derivatives of the present invention comprises the steps of:

heating a mixture of at least one salicylic acid compound and a polyvalent metal salt of an organic carboxylic acid;

reacting the mixture with at least one styrene compound at 100° to 150° C. in a mole ratio of at least one salicylic acid compound to the styrene compound of 1.5:3.0, or heating a mixture of at least one salicylic acid compound, a polyvalent metal salt of an organic carboxylic acid and a partial amount of at least one styrene compound;

reacting the mixture with a residual amount of at least one styrene compound in a mole ratio of the salicylic acid compound to the styrene compound 1.5:3.0 at 100° to 150° C.

The polyvalent metal salt of salicylic derivatives according to the present invention are obtained by reacting the ring-substituted salicylic compounds with a polyvalent metal compound at 70° to 180° C. in water or an organic solvent, if needed.

The metal salt may also be obtained by reacting an alkali metal or ammonium salt of the salicylic compound with the polyvalent metal compound in aqueous medium. Zinc salts of the salicylic derivative are preferred.

Ammonium salts of carbonic acid, bicarbonic acid, acetic acid, formic acid and benzoic acid can accelerate such a reaction.

Suitable polyvalent metal compounds include oxides, carbonates and hydroxides of polyvalent metals, including zinc oxide, zinc chloride, zinc sulfate, zinc carbonate, zinc hydroxide, aluminum sulfate, nickel sulfate, tin chloride and zirconium oxychloride.

The metal compound is used in equivalent ratio of 0.5 to 2, preferably 0.8 to 1.2 based on the ring-substituted salicylic compound being reacted. The polyvalent metal salts of the ring-substituted salicylic compounds of the present invention are solid, having a softening point of no less than 40° C. when they are measured in accordance with the ring-ball method in JAPANESE INDUSTRY STANDARD K-2207.

Suitable sensitizers for the color developer of the present invention include polyalkylene polyol such as polyethylene glycol, polypropylene glycol, polybutylene glycol, polytetramethylene glycol and random- or block-copolymerized glycol thereof, and alkyl-capped or acyl-capped polyalkylene polyol capped at one end or both ends, in which the alkyl group has 1 to 6 carbon atoms and the acyl group has 6 to 23 carbon atoms.

Among these, polytetramethylene glycol, random or block copolymers of polytetramethylene glycol and alkylene oxides and acyl-capped polytetramethylene glycol are preferred, with polytetramethylene glycol and dilaurate or dioleate esters of polyethylene glycol being more preferred.

The number average molecular weight of the polyether type sensitizer described above ranges from 500 to 30,000, preferably from 600 to 4,000. When it is below 500, the speed of color development decreases and when it is over 30,000, compatibility of the polyvalent metal salts of the ring-substituted salicylic compounds with such sensitizers decreases.

The number average molecular weight of the ester type sensitizer ranges from 100 to 10,000, preferably from 150 to 4,000. When it is below 100, the speed of color development decreases and when it is over 10,000, compatibility of the polyvalent metal salts of the ring-substituted salicylic compounds with such sensitizers decreases.

The sensitizer of the present invention can be used in amounts of 1 to 30% by weight, preferably 2 to 20% by weight based on the polyvalent metal salts of the ring-substituted salicylic compounds.

When content of the sensitizer is below 1% by weight, the speed of color development is not desirable and when it is over 30% by weight, the color concentration decreases.

The color developer of the present invention can contain known color developers, binder resins, pigments, defoamers and thickeners.

Suitable known developers include acidic minerals such as activated clay and bentonite, condensation resin such as condensates of substituted phenols and formaldehyde or bisphenol A and formaldehyde and zinc metals of aliphatic radical-substituted salicylic acids such as zinc 3,5-bis-tert-butyl salicylate and zinc 3, 5-dicyclohexyl salicylate.

Suitable binder resins include starch and derivatives thereof, cellulose compounds such as methoxy cellulose, hydroxy cellulose, carboxymethyl cellulose, methyl cellulose and ethyl cellulose, water-soluble polymers with anionic character such as sodium polyacrylate, saponified copolymers of styrene and maleic anhydride and saponified copolymers of isobutylene and maleic anhydride, water-soluble polymers with nonionic character such as copolymers of acrylamide and acrylate ester, terpolymers of acrylamide, acrylate ester and methacrylic acid, polyacrylamide, polyvinyl alcohol, polyvinylpyrrolidone, sodium arginate, gelatin and casein and latexes of polymers such as copolymers of styrene and butadiene, copolymer of styrene, butadiene and acrylate, copolymers of vinyl acetate and vinyl chloride, copolymers of ethylene and vinyl acetate, polystyrene, povinylacetate, polyurethane, polyacrylate and poly(butylmethacrylate).

Binder resins can be used in amount of 5 to 40% by weight, preferably 10 to 30% by weight based on a dry coating composition containing the invention color developer.

Suitable pigments include inorganic pigments such as kaolin, clay, talc, calcium carbonate, titanium oxide, zinc oxide, aluminum hydroxide and barium sulfate and a powder of polymers such as condensation resin of urea and formalin and polystyrene.

Pigments can be used in amounts of from 40 to 95% by weight based on a dry coating composition containing the invention color developer.

The developer of the present invention may be used in the form of organic solvent solution or an aqueous dispersion. Such solvents are toluene, methyl ethyl ketone and ethyl acetate.

The water-dispersed developers are obtained by known methods.

A suitable process for the preparation of the dispersion comprises pulverizing and water-dipersing the polyvalent metal salts of the above ring-substituted salicylic compounds having an average particle size diameter of not more than about 2 microns, preferably not more than 1.5 microns, in the presence of water-soluble polymers by means of grinding mills such as a ball mill, an attriter and a sand grinder.

The water-dispersed developers are also obtained by powerfully mixing alkali metal or ammonium salts of the ring-substituted salicylic compounds with an aqueous solution of inorganic metal salts such as zinc sulfate or zinc chloride in the presence of a dispersant by means of a homomixer.

The water-dispersed developers are also obtained by a process comprising the steps of dissolving the polyvalent metal salts of the ring-substituted salicylic compounds in toluene, methyl ethyl ketone, ethyl acetate or ethylene dichloride, accompanied with water-soluble solvents such as methanol, ethanol, acetone and dioxane, if needed, and then powerfully mixing the resultant solution with a dispersant and distilling off the solvent used.

Suitable dispersants include dispersants of a polymer type such as alkali metal salts of sulfonated (co)polymers of styrenes. polyvinylalcohol, condensates of naphthalene sulfonate and formalin, saponified copolymers of styrene/maleic anhydride, polyacrylate salts, (co) polymers of hydroxyalkyl (meth)acrylate, hydroxymethyl cellulose, hydroxypropyl cellulose, oxidized starch and sodium arginate, anionic surfactants such as dodecylbenzene sulfonate salts, dioctylsulfosuccinate salts and sulfate salts of ethylene oxide adducts of nonylphenol and nonionic surfactants such as ethylene oxide adducts of nonylphenol, octylphenol, fatty alcohols or fatty acids.

Sulfonate salts of polystyrenes, styrene/maleic acid copolymers, styrene/acrylic acid copolymers and styrene/(meth)acrylate copolymers, are preferred in view of their decreased foaming action and their liability to finely pulverizing the color developer. In particular, alkali or alkaline earth metal salts or ammonium salts of sulfonated polystyrenes with sulfonation extent of 40 to 70 mole % are preferred.

The dispersant is usually used in amounts of 0.05 to 15% by weight, preferably 0.5 to 10% by weight based on the polyvalent metal salts of the ring-substituted salicylic compounds.

The content of the polyvalent metal salts of the ring-substituted salicylic compounds in the invention coating composition is usually from 3 to 30% by weight.

The color developer sheet of the present invention can be obtained by applying a solution or dispersion comprising a color developer of the present invention and the above additives, if desired, on a supporting sheet by means of an air-knife coater, a blade coater or a roll coater, etc. followed by drying at 20° to 120° C.

The applied amount of the coating composition is usually 0.5 to 20 grams, preferably 2 to 10 grams, per square meter when dry.

Suitable supporting sheets include papers made of pulp, synthetic papers and plastic films. Papers are preferred.

EXAMPLE

Next, the present invention will be explained in more detail by way of the following examples, which are not intended to restrict the scope of the present invention.

All "parts" and "%" are "parts by weight" and "% by weight" unless otherwise specifically indicated.

(EVALUATION)

(1) Hue of a color developer:

The Hue is determined by the GARDNER value when the developer is prepared in 65% toluene solution. Higher values represent a greater extent of coloration.

(2) Content of salicylic derivatives:

Content of the components, i.e., the ring-substituted salicylic compounds having one, two or three styrene units is determined by High Pressure Liquid Chromatography analysis (column: Shimpack PREP-ODS(H)KIT, available from SHIMAZU corporation in Japan). Detection is carried out at 240 nm.

(3) Average particle size diameter of dispersion:

The particle size diameter is measured by means of a particle size distribution measuring apparatus of the laser diffractional scattering type (model LA-700, available from HORIBA, LTD. in Japan).

Smaller particle size diameters represent a higher color-developing density in pressure-sensitive recording paper.

(4) Whiteness of sheets of color-developer:

The whiteness is determined by measuring the Hunter value of a surface of a color developer sheet by means of a multi-lamp colorimeter (model MSC-2, available from SUGA TEST INSTRUMENTS Co. LTD. in Japan).

Higher Hunter values represent higher degrees of whiteness or brightness in a sheet.

(5) Yellowness by exposure to NOx gas:

The yellowness upon exposure of a color developer sheet to NOx gas is determined in accordance with Japanese Industry Standard L0855 and indicated by the Hunter measurement.

A higher Hunter value represents deeper yellowness in the sheet.

(6) Color concentration of the developed image:

This test is carried out by placing the surface of an upper sheet of paper coated with crystal violet lactone dye on a color developer sheet of this invention and applying a calender roll on the piled sheet, in an atmosphere at 20° C. and a relative humidity of 65%. Post-15 sec., -60 sec. and -one hour color concentration of the developed image are measured by a reflection densitometer (made by Macbeth).

A higher value represents higher concentration of developed image.

Example 1

One hundred thirty eight parts of salicylic acid, 5.5 parts of zinc acetate and 52 parts of styrene were placed in a SUS-made vessel and heated to 155° C. with stirring. The resultant mixture was melted with generation of heat. Then 156 parts of styrene was added dropwise at 145° C. over 2 hours to form a pale yellow-brown, clear and viscous liquid. It was heated for an additional 1 hour at 145° C. The amount of unreacted styrene remaining in the mixture was not more than 1%.

The mixture was determined to contain 5-α-methylbenzyl salicylic acid and 3-α-methylbenzyl salicylic acid as a ring-substituted salicylic compound having one styrene unit, 3,5-di(α-methylbenzyl) salicylic acid as a ring-substituted salicylic compound having two styrene units, and 3-α-methylbenzyl-5-(1',3'-diphenyl butyl) salicylic acid, 3-(1',3'-diphenylbutyl)-5-α-methylbenzyl salicylic acid, 3-α-methylbenzyl-5-[4'-(α-methylbenzyl)-α-methylbenzyl] salicylic acid, 3-[α-methyl-4'-(α-methylbenzyl)-benzyl]-5-α-methylbenzyl salicylic acid as ring-substituted salicylic compounds having three styrene units, by analysis via high pressure liquid chromatography. The classes of components were contained in weight ratio of 38:40:22 respectively. Then 205 parts of toluene and 48 parts of basic zinc carbonate (zinc content of 58% by weight) were added to the mixture and refluxed for 2 hours with stirring to form a 65% solution of the zinc salts of the salicylic derivatives in toluene.

The GARDNER value of the solution of EXAMPLES 1 is shown in Table 1.

Example 2

One hundred thirty eight parts of salicylic acid, 50 parts of the 65% solution of zinc salt of salicylic derivatives of EXAMPLE 1 in toluene and 52 parts of styrene were placed in a SUS-made vessel and heated to 155° C. with stirring. The resultant mixture was melted with generation of heat. Then 156 parts of styrene was added dropwise at 145° C. over 2 hours to form a pale yellow-brown, clear and viscous liquid. It was heated for an additional one hour at 145° C. The content of unreacted styrene remaining in the mixture was not more than 1%.

The mixture was determined to contain 5-α-methylbenzyl salicylic acid and 3-α-methylbenzyl salicylic acid as a ring-substituted salicylic compound having one styrene unit, 3,5-di(α-methylbenzyl) salicylic acid as a ring-substituted salicylic compound having two styrene units, and 3-α-methylbenzyl-5-(1',3'-diphenyl butyl) salicylic acid, 3-(1',3'-diphenylbutyl)-5-α-methylbenzyl salicylic acid, 3-α-methylbenzyl-5-[4'-(α-methylbenzyl)-α-methy benzyl salicylic acid, 3-[α-methyl-4'-(α-methylbenzyl)-benzyl]-5-α-methylbenzyl salicylic acid as ring-substituted salicylic compounds having three styrene units, by analysis via high pressure liquid chromatography. The components were contained in weight ration of 27:46:27 respectively. Then 205 parts of toluene and 53 parts of basic zinc carbonate (zinc content of 58%) were added to the mixture and refluxed for 2 hours with stirring to form a 65% solution of zinc salts of the salicylic derivatives in toluene.

The GARDNER value of the solution of EXAMPLES 2 is shown in Table 1.

Example 3

One hundred thirty eight parts of salicylic acid, 30 parts of zinc 3,5-di(αmethylbenzyl) salicylate and 52 parts of styrene were placed in a SUS-made vessel and heated to 145° C. with stirring. The resultant mixture was melted with generation of heat. Then 208 parts of styrene was added dropwise at 145° C. over 2 hours, followed by heating for an additional one hour to form a pale yellow-brown, clear and viscous liquid. It was heated for additional one hour at 145° C. The content of unreacted styrene remaining in the mixture was not more than 0.1%.

The mixture was determined to contain 5-α-methylbenzyl salicylic acid and 3-α-methylbenzyl salicylic acid as a ring-substituted salicylic compound having one styrene unit, 3,5-di(α-methylbenzyl) salicylic acid as a ring-substituted salicylic compound having two styrene units, and 3-α-methylbenzyl-5-(1',3'-diphenyl butyl) salicylic acid, 3-(1',3'-diphenylbutyl)-5-α-methylbenzyl salicylic acid, 3-α-methylbenzyl-5-[α-methyl-4'-(α-methylbenzyl)-benzyl salicylic acid, 3-[α-methyl-4'-(α-methylbenzyl)-benzyl]-5-α-methylbenzyl salicylic acid is ring-substituted salicylic acid compounds having three styrene units, by analysis via high pressure liquid chromatography. The components were contained in weight ratio of 11:58:31 respectively. Then 205 parts of toluene and 53 parts of basic zinc carbonate (zinc content of 58%) were added to the mixture and refluxed for 2 hours with stirring to form a 65% solution of zinc salt of salicylic derivatives in toluene.

The GARDNER value of the solution of EXAMPLES 3 is shown in Table 1.

Comparative Examples 1 to 2

In the same manner as in EXAMPLE 1, except for using sulfuric acid (COMPARATIVE EXAMPLE 1) or p-toluene sulfonic acid (COMPARATIVE EXAMPLE 2) instead of zinc acetate, a solution of zinc salt of salicylic derivatives was obtained. The solution contained a grayish black precipitate.

The GARDNER values of each solution of COMPARATIVE EXAMPLES 1 and 2 are shown in Table 1.

TABLE 1

| | Catalyst | Hue (GARDNER value) |
|---|---|---|
| EXAMPLE 1 | zinc acetate | 6 |
| EXAMPLE 2 | zinc salts of salicylic derivative of EXAMPLE 1 | 6 |
| EXAMPLE 3 | zinc 3,5-di(α-methylbenzyl) salicylate | 6 |
| COMPARATIVE EXAMPLE 1 | sulfuric acid | 15 |
| COMPARATIVE EXAMPLE 2 | p-toluene sulfonic acid | 15 |

Examples 4 to 6 and Comparative Examples 3 to 4

Each dispersion of EXAMPLES 4 to 6 and COMPARATIVE EXAMPLES 3 to 4 was prepared in the following way.

A solution of 3.3 parts of KURARAY POVAL PVA 205 (a polyvinyl alcohol) in 100 parts of water was mixed with each toluene solution of EXAMPLES 1 to 3 and COMPARATIVE EXAMPLES 1 to 2 with stirring by means of a homomixer (made by TOKUSHU KIKA company) at 10,000 r.p.m. to form a dispersion having an average particle size diameter of 0.5 microns in a mixture of water and toluene. Toluene was removed from the dispersion by application of heat to form a ca. 50% concentrated dispersion. The dispersions of EXAMPLES 4 to 6 were milk-white, however those of COMPARATIVE EXAMPLES 3 to 4 were brown. EXAMPLES 7 to 9 and COMPARATIVE EXAMPLES 5 to 6.

Each dispersion of EXAMPLES 4 to 6 and COMPARATIVE EXAMPLES 3 to 4 was mixed with the additives described below to form a coating composition.

| [Coating composition] | |
|---|---|
| Aqueous dispersion of zinc salt of EXAMPLES 4 to 6 or COMPARATIVE EXAMPLES 3 and 4 | 4 parts |
| Calcium carbonate | 20 parts |
| Sodium hexametaphosphate | 0.1 parts |
| 10% solution of KURARAY PVA 117 in water | 20 parts |
| Water | 55.9 parts |

A color developer sheet was obtained by coating the above composition on a fine paper of 50 g/$m^2$ such that at dryness the coating is 5 g/$m^2$ by means of a coating rod and drying at 60° C.

The extent of whiteness in the coated surface on the sheet is shown in Table 2. The sheets prepared from the dispersion in EXAMPLES 4 to 6 show higher whiteness than those prepared from COMPARATIVE EXAMPLES 3 to 4.

Evaluation of the sheets of EXAMPLES 7 to 9 for yellowness by exposure to NOx gas and color development is shown in Table 3.

TABLE 2

Result of Hue, Particle size diameter and Whiteness

| | Hue of dispersions | Average particle size diameter | Extent of whiteness (microns) |
|---|---|---|---|
| EXAMPLE 7 | milk-white | 0.5 | 76.2 |
| EXAMPLE 8 | milk-white | 0.5 | 76.3 |
| EXAMPLE 9 | milk-white | 0.5 | 76.3 |
| COMPARATIVE EXAMPLE 5 | brown | 0.5 | 73.2 |
| COMPARATIVE EXAMPLE 6 | brown | 0.5 | 73.4 |

Comparative Examples 7 to 8

In the same manner as in EXAMPLES 7 to 9 except for using an aqueous dispersion of zinc 3,5-di(α-methylbenzyl) salicylic or a p-phenylphenol/formalin resin instead of zinc salt of salicylic derivative of EXAMPLES 4 to 6, the color-developer sheet was prepared.

Evaluation of yellowness by exposure to NOx gas and color development is shown in Table 3.

TABLE 3

Test result of discoloration and color development

| | Yellowness by exposure to NOx gas | color-developing density after: 15 sec. | 60 sec. | 1 hr. |
|---|---|---|---|---|
| EXAMPLE 7 | 71.2 | 0.44 | 0.64 | 0.77 |
| EXAMPLE 8 | 70.4 | 0.43 | 0.65 | 0.79 |
| EXAMPLE 9 | 70.5 | 0.44 | 0.65 | 0.78 |
| COMPARATIVE EXAMPLE 7 | 65.5 | | | 0.74 |
| COMPARATIVE EXAMPLE 8 | 63.2 | | | 0.72 |

Example 10

In the same manner as in EXAMPLES 7 to 9, a coating composition and a sheet coated therewith were prepared by using a mixture of zinc 3-α-methylbenzyl-salicylate, zinc 5-α-methylbenzyl salicylate, zinc 3,5-bisα-methylbenzyl salicylate zinc, 3-α-methylbenzyl-5-1′,3′-diphenylbutyl salicylate, zinc 3-1′,3′-diphenylbutyl-5-α-methylbenzyl salicylate in a weight ratio of 12:12:50:13:13.

Evaluation of the sheet for yellowness by exposure to NOx gas and color development is shown in Table 4.

Comparative Example 9

In the same manner as in EXAMPLEs 7 to 9, a coating composition and a sheet coated therewith were prepared by using a mixture of zinc 3-α-methylbenzyl salicylate and zinc 5-α-methylbenzyl salicylate in a weight ratio of 50:50.

Evaluation of yellowness of the sheet upon exposure to NOx gas and color development is shown in Table 4.

TABLE 4

Test result of discoloration and color development

| | Yellowness by exposure to NOx gas | color-developing density after: 15 sec. | 60 sec. | 1 hr. |
|---|---|---|---|---|
| EXAMPLE 10 | 71.2 | 0.45 | 0.64 | 0.79 |
| COMPARATIVE | 72.2 | 0.30 | 0.35 | 0.59 |

TABLE 4-continued

| Test result of discoloration and color development | | | | |
|---|---|---|---|---|
| | Yellowness by exposure | color-developing density after: | | |
| | to NOx gas | 15 sec. | 60 sec. | 1 hr. |
| EXAMPLE 9 | | | | |

Example 11

One hundred parts of a composition containing zinc salt of the ring-substituted salicylic compounds of EXAMPLE 1 and 5 parts of polytetramethylene glycol (hereinafter abbreviated PTMG) having a number average molecular weight of 3,000 were dissolved in 100 parts of toluene at 70° C. A solution of a color developer of this invention in toluene was thus obtained.

Example 12

One hundred parts of a composition containing the zinc salts of the ring-substituted salicylic compounds of EXAMPLE 1 and 5 parts of polyethylene glycol (hereinafter abbreviated PEG) having a number average molecular weight of 1,000 were dissolved in 100 parts of toluene at room temperature. A solution of a color developer of this invention in toluene was thus obtained.

Example 13

One hundred parts of a composition containing the zinc salts of the ring-substituted salicylic compounds of EXAMPLE 2 were mixed 10 parts of PTMG having a number average molecular weight of 1,000 at 130° C. A color developer of this invention was thus obtained.

Example 14

One hundred parts of a composition of the zinc salts of the ring-substituted salicylic acid of EXAMPLE 2 to 7 parts of polyoxyethylene polytetramethylene glycol (content of PEG moiety is 10% by weight) having a number average molecular weight of 1,400 were dissolved in 100 parts of toluene at room temperature. A solution of a color developer of this invention in toluene was thus obtained.

Example 15

Two hundred parts of a solution comprising a composition of the zinc salts of the ring-substituted salicylic acids of EXAMPLE 1 in toluene were mixed with 200 parts of an aqueous solution made by dissolving 8 parts of KURARAY POVAL PVA 205 (available from KURARAY) in water at 10,000 r.p.m. by means of a homomixer (made by TOKUSHU KIKA company in Japan) to form a dispersion having an average particle size diameter of 0.5 microns in a mixture of toluene and water. Toluene used was removed from the dispersion by application of heat. The resultant aqueous dispersion which had an average particle size diameter of 0.5 microns was mixed with 15 parts of a 2% aqueous solution of xanthan gum to have a 51.0% solids content.

Example 16

In the same manner as in EXAMPLE 15, an aqueous dispersion of a color developer of EXAMPLE 2 was obtained by using a solution of a composition of EXAMPLE 2 in toluene.

Example 17

One hundred thirty parts of a composition of EXAMPLE 13 is heated up to 70° C. and mixed with 70 parts of toluene. The resulting solution was mixed with an aqueous solution made by dissolving 8 parts of KURARAY POVAL PVA 205 (available from KURARAY) in 200 parts of water were mixed at 10,000 r.p.m. by means of a homomixer (made by TOKUSHU KIKA company) to form a dispersion having an average particle size diameter of 0.5 microns in a mixture of toluene and water. Toluene used was removed from the dispersion by application of heat. The resultant aqueous dispersion was mixed with 15 parts of an aqueous solution of xanthan gum to have a 51.0% solids content.

Example 18

In the same manner as in EXAMPLE 15, the aqueous dispersion of a color developer was obtained by using a composition of EXAMPLE 14.

Example 19

In the same manner as in EXAMPLE 15 except for using sodium polystyrene sulfonate with sulfonation extent of 60 mole % instead of KURARAY POVAL PVA 205, an aqueous dispersion of a color developer was obtained.

Example 20

A coating composition was obtained by mixing 4 parts of aqueous dispersion of EXAMPLE 14, 20 parts of calcium carbonate, 0.1 parts of sodium hexametaphosphate, 20 parts of a 10% aqueous solution of KURARAY PVA 117 with 55.9 parts of water.

A color developer sheet was obtained by coating the composition on a fine paper of of 50 $g/m^2$ in an amount such that at dryness the coating is 5 $g/m^2$ by means of a coating rod and drying at room temperature.

A coated surface of an upper sheet of paper with crystal violet lactone dye thereon was placed on the above sheet and a calender roll was applied on the piled sheets to develop a color. The color concentration (image density) of the developed image is measured by a reflection densitometer (model RD914, made by MACBETH company, Division of Kollmorgen Instruments Corporation in U.S.A.) after 15 seconds, 60 seconds and one hour and shown in Table 5.

Example 21

In the same manner as in EXAMPLE 20, a color developer sheet coated with the aqueous dispersion of EXAMPLE 16 was obtained. The color concentration is measured in the same manner as in EXAMPLE 20 and shown in Table 5.

Example 22

In the same manner as in EXAMPLE 20, a sheet of a color developer coated with an aqueous dispersion of EXAMPLE 17 was obtained. The color concentration is measured in the same manner as in EXAMPLE 20 and shown in Table 5.

Example 23

In the same manner as in EXAMPLE 20, a color developer sheet coated with the aqueous dispersion of EXAMPLE 18 was obtained. The color concentration is measured in the same manner as in EXAMPLE 20 and shown in Table 5.

Comparative Example 10

Thirty parts of a composition containing the zinc salts of the ring-substituted salicylic compounds of EXAMPLE 1 was dissolved in a mixture of 5 parts of cottonseed oil and 30 parts of toluene. In the same manner as in EXAMPLE 5, the resultant solution was changed into an aqueous dispersion.

In the same manner as in EXAMPLE 9, a color developer sheet coated with this dispersion was obtained and the color concentration is measured in the same manner as in EXAMPLE 20 and shown in Table 5.

TABLE 5

Test Result of Color Development of the Sheet

| | Color concentration | | |
|---|---|---|---|
| | After 15 seconds | After 60 seconds | After 1 hour |
| EXAMPLE 20 | 0.59 | 0.68 | 0.75 |
| EXAMPLE 21 | 0.56 | 0.64 | 0.75 |
| EXAMPLE 22 | 0.56 | 0.65 | 0.75 |
| EXAMPLE 23 | 0.57 | 0.66 | 0.75 |
| COMPARATIVE EXAMPLE 10 | 0.56 | 0.62 | 0.65 |

Example 24

A solution of 100 parts of a composition of zinc ring-substituted salicylates of EXAMPLE 1 in 100 parts of toluene and an aqueous solution made by dissolving 8 parts of KURARAY POVAL PVA 205 (available from KURARAY company) in 100 parts of water were mixed at 10,000 r.p.m. by means of a homomixer (made by TOKUSHU KIKA company) to form a dispersion having an average particle size diameter of 0.5 microns in a mixture of toluene and water. The dispersion was mixed with 5 parts of dilaurate ester of polyoxyethylene glycol having a number average molecular weight of 200 and the toluene was distilled off. Then 15 parts of a 2% aqueous solution of xanthan gum was mixed with the composition to form a 51.0% concentrated dispersion.

Example 25

In the same manner as in EXAMPLE 24 except for using monooleate ester of polyoxyethylene glycol having a number average molecular weight of 200 instead of polyoxyethylene dilaurate, a 51.0% concentrated dispersion having an average particle size diameter of 0.5 microns in water was obtained after removing toluene.

Example 26

After removing toluene from the dispersion of EXAMPLE 24, the resultant aqueous dispersion was mixed with 10 parts of polyoxyethylene dilaurate while maintaining a temperature of 80° C. and then cooled to room temperature. Then 15 parts of a 2% aqueous solution of xanthan gum was mixed with the dispersion containing the sensitizer to form a 51.0% concentrated dispersion in water.

Example 27

In the same manner as in EXAMPLE 24 except for using 5 parts of dilaurate ester of polypropylene glycol having a number average molecular weight of 200 instead of 5 parts of dilaurate ester of polyethylene glycol, a 51.0% concentrated dispersion having an average particle size diameter of 0.5 microns in water was obtained.

Example 28

In the same manner as in EXAMPLE 24 except for using 10 parts of dioleate ester of polypropylene glycol having a number average molecular weight of 1000 instead of 5 parts of dilaurate ester of polyethylene glycol, a 51.0% concentrated dispersion having an average particle size diameter of 0.5 microns in water was obtained.

Example 28

In the same manner as in EXAMPLE 24 except for using 10 parts of dioleate ester of polypropylene glycol having a number average molecular weight of 1000 instead of 5 parts of dilaurate ester of polyethylene glycol, a 51.0% concentrated dispersion having an average particle size diameter of 0.5 microns in water was obtained after distilling off toluene.

Example 29

In the same manner as in EXAMPLE 24 except for using 10 parts of dilaurate ester of polyoxytetramethylene glycol having a number average molecular weight of 4000 instead of 5 parts of dilaurate ester of polyethylene glycol, a 51.0% concentrated dispersion in water having an average particle size diameter of 0.5 microns in water was obtained after distilling off toluene.

Example 30

In the same manner as in EXAMPLE 24 except for using 10 parts of distearate ester of polyoxytetramethylene glycol having a number average molecular weight of 1000 instead of 5 parts of dilaurate ester of polyethylene glycol, a 51.0% concentrated dispersion having an average particle size diameter of 0.5 microns in water was obtained after distilling off toluene.

Examples 31 to 37

A coating composition was obtained by mixing 4 parts of the water-dispersed developer of EXAMPLES 24 to 30 respectively, 20 parts of calcium carbonate, 0.1 parts of sodium hexametaphosphate and 20 parts of a 10% concentrated aqueous solution of KURARAY POLAL PVA 117 (available from KURARAY company) with 55.9 parts of water.

A color developer sheet was prepared by coating the composition on a fine paper weighing 50 g per square meter in an amount of 5 g per square meter by means of a coating rod and drying at room temperature. A surface of an upper sheet of paper coated with crystal violet lactone was placed on the developer sheet and a calender roll was applied on the piled sheets to develop a color at an atmosphere of 23° C. and relative humidity of 50%. The color concentration (image density) of the developed image is measured by a reflection densitometer after 15 seconds, 60 seconds and one hour.

Evaluation of each sheet is shown in Table 6.

TABLE 6

Test Result of Color Development of the Sheet

| | Color concentration | | |
|---|---|---|---|
| | After 15 sec. | After 60 sec. | After 1 hr. |
| EXAMPLE 30 | 0.60 | 0.68 | 0.76 |
| EXAMPLE 31 | 0.59 | 0.68 | 0.76 |
| EXAMPLE 32 | 0.59 | 0.69 | 0.74 |
| EXAMPLE 33 | 0.57 | 0.67 | 0.76 |

TABLE 6-continued

| Test Result of Color Development of the Sheet | | | |
|---|---|---|---|
| | Color concentration | | |
| | After 15 sec. | After 60 sec. | After 1 hr. |
| EXAMPLE 34 | 0.59 | 0.68 | 0.74 |
| EXAMPLE 35 | 0.57 | 0.66 | 0.75 |
| EXAMPLE 36 | 0.57 | 0.67 | 0.75 |

Comparative Example 11

In the same manner as in EXAMPLES 4 to 6 except for using zinc 3,5-bis(α-methylbenzyl) salicylate instead of a composition containing the zinc salts of the ring-substituted salicylic compounds of EXAMPLES 1 to 3, an aqueous dispersion of a color developer was obtained. In the same manner as in EXAMPLES 7 to 9 by using this dispersion, a color developer sheet was prepared.

Evaluation of this sheet for yellowness by exposure to NOx gas and color development is shown in Table 7.

Comparative Example 12

In the same manner as in EXAMPLES 4 to 6 except for using a mixture of zinc 3,5-bis(α-methylbenzyl) salicylate, zinc 3-α-methylbenzyl-5-(1′,3′-diphenylbutyl) salicylate and zinc 3-(1′,3′-diphenylbutyl)-5-α-methylbenzyl salicylate in a weight ratio of 80:10:10 instead of a composition containing the zinc salts of the ring-substituted salicylic compounds of EXAMPLES 1 to 3, an aqueous dispersion of a color developer was obtained. In the same manner as in EXAMPLES 7 to 9 by using this dispersion, a color developer sheet was prepared.

Evaluation of this sheet for yellowness by exposure to NOx gas and color development is shown in Table 7.

Comparative Example 13

In the same manner as in EXAMPLES 4 to 6 except for using a mixture of zinc 3-α-methylbenzyl salicylate, zinc 5-α-methylbenzyl salicylate, zinc 3,5-bis(α-methylbenzyl) salicylate, zinc 3-α-methylbenzyl-5-(1′,3′-diphenylbutyl) salicylate and zinc 3-(1′,3′-diphenylbutyl)-5-α-methylbenzyl salicylate in a weight ratio of 1:1:10:44:44 instead of a composition containing the zinc salts of the ring-substituted salicylic compounds of EXAMPLES 1 to 3, an aqueous dispersion of a color developer was obtained. In the same manner as in EXAMPLES 7 to 9 by using this dispersion, a color developer sheet was prepared.

Evaluation of this sheet for yellowness by exposure to NOx gas and color development is shown in Table 7.

TABLE 7

| Test Result of Discoloration and Color Development | | | | |
|---|---|---|---|---|
| | Yellowness by Exposure to NOx Gas | Color Concentration after: 15 sec. | 60 sec. | 1 hr. |
| COMPARATIVE EXAMPLE 11 | 62.5 | 0.44 | 0.65 | 0.77 |
| COMPARATIVE EXAMPLE 12 | 68.2 | 0.43 | 0.59 | 0.68 |
| COMPARATIVE EXAMPLE 13 | 70.2 | 0.44 | 0.55 | 0.62 |
| (shown again for clear differences) | | | | |
| EXAMPLE 7 | 71.2 | 0.44 | 0.64 | 0.77 |
| EXAMPLE 8 | 70.4 | 0.43 | 0.65 | 0.79 |
| EXAMPLE 9 | 70.5 | 0.44 | 0.65 | 0.74 |
| EXAMPLE 10 | 71.2 | 0.45 | 0.64 | 0.79 |
| COMPARATIVE EXAMPLE 9 | 72.2 | 0.30 | 0.35 | 0.59 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters Patent of the United State is:

1. A color developer comprising a polyvalent metal salt of a styrenated salicylic acid derivative comprising 5 to 60% by weight of at least one ring-substituted salicylic compound having one styrene unit, 15 to 60% by weight of at least one ring-substituted salicylic compound having two styrene units and 10 and 40% by weight of at least one ring-substituted salicylic compound having three styrene units, said styrene unit or units having been introduced by reaction with a styrene compound, wherein at least 25% of the ring-substituted salicylic compound having one, two or three styrene units are polyvalent metal salts based on the total amount of ring-substituted salicylic compounds present.

2. A color developer according to claim 1, wherein the salicylic derivative is obtained by reacting at least one salicylic acid compound with at least one styrene compound in the presence of a polyvalent metal salt of an organic carboxylic acid.

3. A color developer according to claim 2, wherein the metal of the salicylic derivative metal salt is one identical with the metal of the organic carboxylate salt.

4. A color developer according to claim 2, wherein the mole ratio of the salicylic acid compound to the styrene compound ranges from 1:1.5 to 1:3.0.

5. A color developer according to claim 2, wherein the carboxylic acid is salicylic acid or a ring-substituted salicylic acid.

6. A color developer according to claim 2, wherein the metal salt of the organic carboxylic acid comprises 1 to 100 parts by weight per 100 parts by weight of the salicylic acid compound.

7. A color developer according to claim 1, wherein the metal of the salicylic derivative metal salt is zinc.

8. A color developer according to claim 1, wherein the metal of the salicylic derivative metal salt is selected from the group consisting of calcium, barium, lead, aluminum, zirconium, vanadium and tin.

9. A color developer according to claim 1, which further comprises a sensitizer.

10. A color developer according to claim 9, wherein the sensitizer is a polyoxyalkylene polyol or an alkyl-capped or acyl-capped derivative thereof.

11. A color developer according to claim 10, wherein the polyol is polytetramethylene glycol.

12. A color developer according to claim 10, wherein the polyol derivative is a fatty acid ester of the polyoxyalkylene polyol.

13. A color developer according to claim 12, wherein the fatty acid is one having 6 to 23 carbon atoms.

14. A color developer according to claim 12, wherein the ester is the dilaurate or dioleate of polyoxyethylene glycol.

15. An aqueous dispersion wherein the color developer of claim 1 is dispersed in the presence of a dispersant.

16. An aqueous dispersion according to claim 15, wherein the dispersant is a salt of polystyrene having a sufonic acid group content of 40 to 70 mole %.

17. An aqueous dispersion according to claim 15, which comprises particles of the color developer having an average size diameter of not more than about 2 microns.

18. An aqueous dispersion according to claim 15, which further contains a binder resin and an inorganic pigment or a powdered polymer.

19. A color developer sheet, which comprises a supporting sheet containing the color developer of claim 1 thereon.

20. A color developer sheet according to claim 19, which is formed with the aqueous dispersion of claim 15.

21. A color developer sheet according to claim 19, wherein the supporting sheet is selected from the group consisting of papers made of pulp, synthetic papers and plastic films.

22. A color developer according to claim 1, wherein said salicylic derivative is obtained by reaction of a salicylic acid compound with a styrene compound.

23. A color developer according to claim 22, wherein said salicylic acid compound is selected from the group consisting of salicylic acid, alkyl-substituted salicylic acids, alicyclic radical-substituted salicylic acids, halogen-substituted salicylic acids, and mixtures of these acids.

* * * * *